United States Patent [19]
Hines et al.

[11] 3,778,159
[45] Dec. 11, 1973

[54] DISTANCE MEASURING APPARATUS AND METHOD UTILIZING PHASE COMPARISON OF MODULATED LIGHT BEAMS

[75] Inventors: Robin H. Hines; William L. Hollinshead; Thomas O. Bolden, all of Tullahoma, Tenn.

[73] Assignee: Laser Systems & Electronics, Inc., Tullahoma, Tenn.

[22] Filed: Mar. 30, 1972

[21] Appl. No.: 239,456

Related U.S. Application Data

[63] Continuation of Ser. No. 18,101, March 10, 1970, abandoned.

[52] U.S. Cl. .................................. 356/5, 343/5 DP
[51] Int. Cl. ................................. 343 12, G01c 3/08
[58] Field of Search .................. 356/4, 5; 343/5 DP, 343/12

[56] References Cited
UNITED STATES PATENTS

| | | | |
|---|---|---|---|
| 3,619,058 | 11/1971 | Hewlett et al. | 356/5 |
| 3,522,992 | 8/1970 | Jaffe | 356/5 |
| 3,503,680 | 3/1970 | Schenkerman | 356/5 |
| 3,652,161 | 3/1972 | Ross | 356/5 |

OTHER PUBLICATIONS

"The Radio Amateur's Handbook," 1954, p. 293.
"Geodolite," Spectra-Physics, Inc., 3-1968.

*Primary Examiner*—Benjamin A. Borchelt
*Assistant Examiner*—S. C. Buczinski
*Attorney*—Lionel N. White

[57] ABSTRACT

Apparatus and method for accurately measuring and digitally displaying the distance between remotely separated points involves modulating a light beam at a known radio frequency, transmitting the light beam from one of the points to reflect from the remote point and return to the transmitting point, digitally measuring the phase difference between the transmitted and returned beams, and determining from such phase difference the distance between the points. The light beam is modulated in sequence with a plurality of RF signals of different frequency in order to resolve ambiguities associated with phase comparison distance measuring techniques, the primary one of such modulating signals being obtained by mixing a reference radio frequency (RF) signal with a reference intermediate frequency (IF) signal derived by division of that reference RF signal, thus retaining a fixed frequency ratio with the reference RF signal. The return RF signal is also mixed with the reference RF signal to derive a second IF signal for comparison with the reference IF signal in a digital phase comparator which utilizes as the clock signal the reference RF signal. This method of deriving from a single oscillator source the various comparative signals greatly increases the tolerances of the system and reduces the need for expensive oscillators of extreme stability. The remaining modulating signals are likewise derived by mixing various RF signals with the reference IF signal, yet all modulating signals are maintained within a narrow frequency band, thus greatly reducing compensation requirements while improving accuracy, by utilizing as the additional RF signals those having frequency differences with the reference RF signal corresponding to half-wavelengths which are related to the half-wavelength of the primary beam-modulating RF signal by different powers of 10.

9 Claims, 5 Drawing Figures

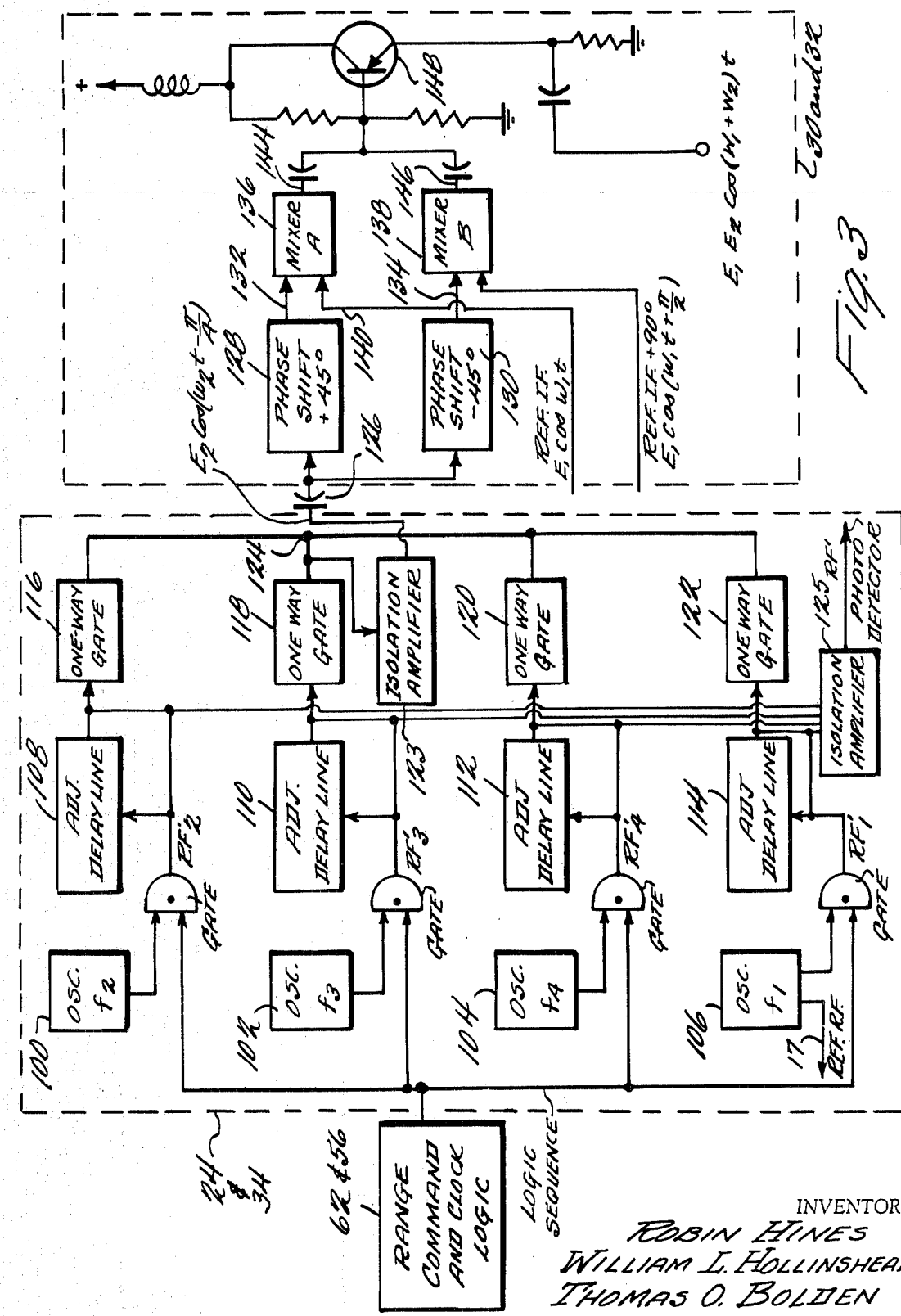

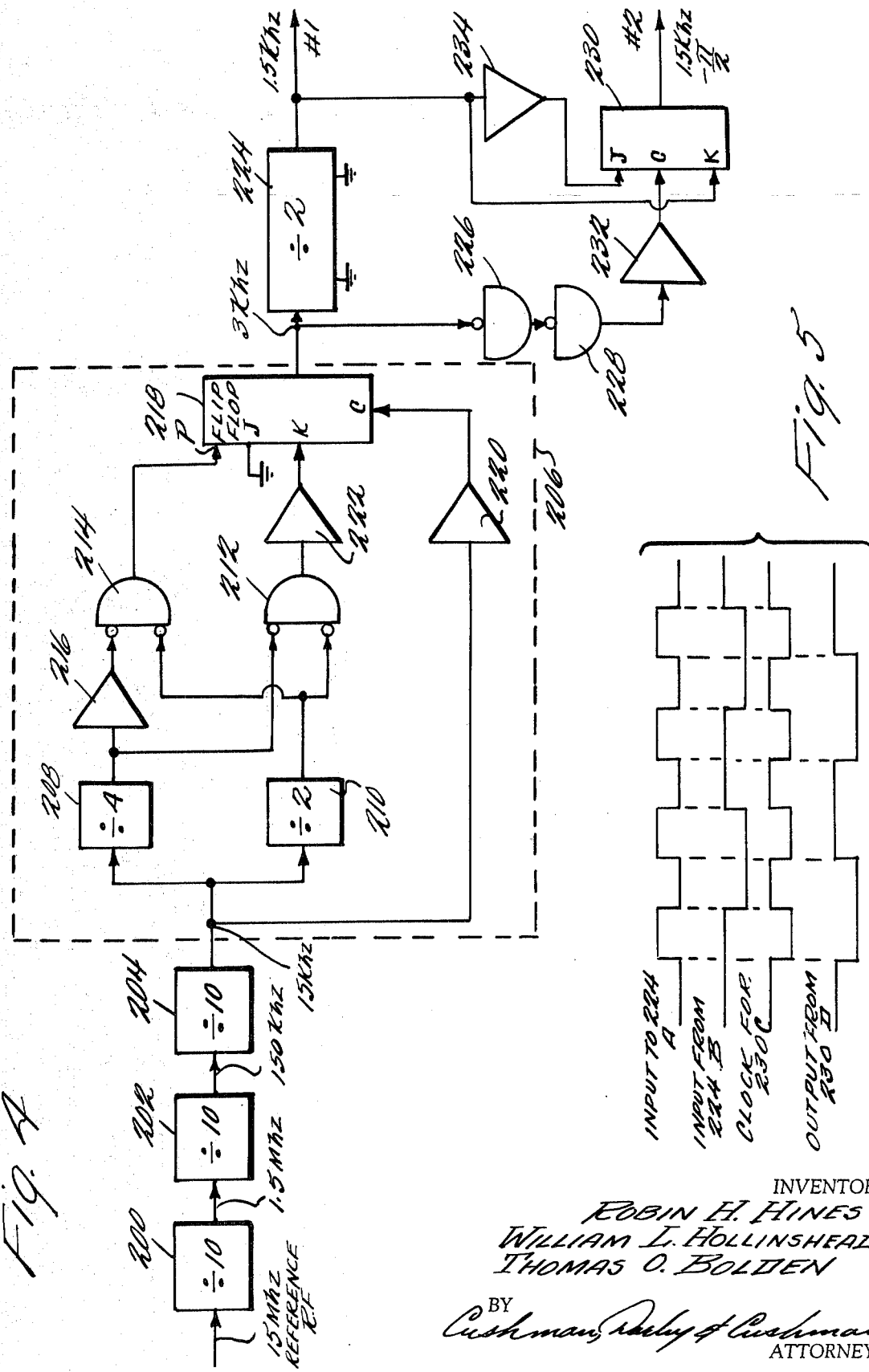

DISTANCE MEASURING APPARATUS AND METHOD UTILIZING PHASE COMPARISON OF MODULATED LIGHT BEAMS

This application is a continuation of U.S. Pat. application Ser. No. 18,101, filed Mar. 10, 1970, now abandoned.

This invention relates to a method and apparatus for measuring distances by detecting a phase shift between transmitted and returned modulated light beams. While various light sources may be effectively employed in the practice of the present invention, this description will be related in terms of a preferred laser beam source.

Although the general application of a laser for distance measuring applications has already been recognized in the art, many of these prior devices are very expensive, are not sufficiently accurate and/or require laborious hand computations to derive a final total distance or range measurement.

It has generally been appreciated that one may measure and calculate distance to a reflecting target located at a remote site by modulating a laser beam at a known frequency (thereby having a known wavelength in a known transmitting medium such as air) where the total range may be given by the equation $R = N\lambda + \Delta$ where $R$ = the total range, $N$ = an unknown number of integral wavelengths and where $\Delta$ = a fractional portion of a wavelength (which may be measured by making a phase comparison between the transmitted and returned signal) and finally, where $\lambda$ = the wavelength of the modulated beam in the transmitting medium. Of course, since the transmitted beam and returned beam are respectively transmitted and detected at a common point, the actual measured phase difference is representative of the total or roundtrip distance to the target site rather than the one-way distance.

In a generalized case, the distance X corresponding to a fraction of an integral wavelength measured at any given frequency may be calculated according to the following formula:

$$X = \tfrac{1}{2} \lambda \, (\phi/2\pi) = \tfrac{1}{2} \, (c/nf) \, (\phi/2\pi) = c\phi/4\pi nf$$

where:
$X$ = the fraction of an integral wavelength being measured
$\phi$ = the measured phase difference in radians
$n$ = the index of refraction of light in the transmitting medium
$c$ = speed of light
$f$ = modulation frequency of the laser beam In using this general technique, one may attempt to measure the entire range all at one time by using a wavelength which is sufficiently long with respect to the distance being measured. This one-shot approach, however, results in considerable error since minute uncertainties in the measured phase difference correspond to rather significant distances. On the other hand, considerable precision may be gained in the least significant digits of a total range measurement by utilizing a wavelength much shorter than the total distance to be measured. For instance, if one uses a half wavelength of 10 meters and measures the resulting phase differences within one part in $10^4$, then the resulting measurement is accurate to within one millimeter in the four least significant digits of the total range. While this technique allows accurate determination of the least significant digits of a range measurement, there is, of course, a rather large uncertainty still remaining due to an unknown number of integral wavelengths contained in the round trip distance between the measuring apparatus and the remote target. This invention teaches a technique for resolving such ambiguity by taking successive measurements at a plurality of frequencies having frequency differences with a fundamental frequency corresponding to half-wavelengths which respectively correspond to decades of a basic unit of measure such as a meter. For instance, if the fundamental frequency has a half-wavelength of 10 meters, the other frequencies have frequency differences with the fundamental corresponding to half-wavelengths of 100, 1,000 and 10,000 meters, etc. The successive range measurements made with these different wavelengths will result in different phase measurements which may be mathematically combined to eliminate the ambiguity in the original measurement by accurately determining one more significant digit with each successive ranging measurement. By adding these accurate and successively increasing significant digits to those accurate least significant digits already obtained from previous measurements, an extremely accurate overall or total distance measurement may be made.

It might be assumed that the best solution to the problem of removing the uncertainty would involve successive measurements made at successive decades of frequency and hence half-wavelengths. For instance, beginning at a fundamental half-wavelength of 10 meters and proceeding to half-wavelengths of 100, 1,000 and 10,000 meters. However, this approach encounters practical difficulty due to the very large frequency bandwidths over which the ranging circuitry must be capable of operation. For instance, in the above example, the various ranging operating frequencies would span a frequency ratio of one to one thousand. Thus, this invention encompasses a technique whereby the same end result is achieved within a significantly smaller bandwidth by making successive ranging measurements at frequencies having frequency differences corresponding to half-wavelength differences with the fundamental half-wavelength of 100, 1,000 and 10,000 meters. While this technique complicates the resulting distance or range calculations somewhat, the savings in bandwidth more than compensates for this increased complexity. In the preferred embodiment of this invention the frequencies 14.984984 MHz, 14.969995 MHz, 14.835130 MHz and 13.486482 MHz are used which cover a bandwidth of only approximately 1,500 KHz instead of approximately 15 MHz as would be the case if the more apparent solution were utilized.

Another problem involved in making laser range measurements involves the accuracy with which the phase-measurements are made since the distance is directly proportional thereto. Differentiating the previous generalized equation, it will be seen that the error in X may be expressed as:

$$\Delta X/X = (\Delta c/c) + (\Delta \phi/\phi) - (\Delta n/n) - (\Delta f/f)$$

The first term is due to the accuracy to which the velocity of light is known and is a bias error and an accepted value of 299,792.5 Km/sec may be used for accurate results.

The fourth term is due to any inaccuracies in the laser beam modulation frequencies. If the actual laser beam is modulated at a radio frequency (RF) of approximately 15 MHz to obtain a phase shift corresponding to the measured distance, extra accuracy may be obtained if the return signal is down-converted to an intermediate frequency (IF) of approximately 1.5 KHz for the actual phase measurement. The down-conversion process has the advantage of smoothing the received signal in a manner analogous to an autocorrelator while also permitting the actual signal processing to be accomplished at a lower frequency where electronic manipulations may be more easily accomplished. Of course, the original phase information is retained in the down-conversion to the intermediate frequency as may be shown by resorting to the standard trigonometric identities.

For an instrument accuracy of 1 ppm or 1 millimeter for the least significant count, it is necessary for the IF to be stable to at least 1 part in $10^4$ (1 mm out of 10 meters) and for the RF to be stable to 1 part in $10^6$. If both frequencies are derived from a single source, a combined stability of $1:10^{10}$ is necessary. A special system of frequency conversion (the subject of another patent application) may be used to obtain an effective stability of the 1 part in $10^{10}$.

The third term is due to variations and inaccurate knowledge of the index of refraction over the total range X and is made up of bias error caused by temperature, pressure, and humidity variations over the path X, and RMS error caused by random atmospheric turbulence variations. The bias error correction is a function of meteorological data measurements and can be made very accurately during automatic digital calculations performed on the phase measurements to derive the total range measurement which is subsequently displayed. Since RMS error is random, the resulting error from random atmospheric turbulence can be reduced by making a large number of measurements and averaging the results.

The error in the phase measurement is due to three separate errors; a bias error in the phase measurements, a random or RMS error in the phase measurement, and a random or RMS error in phase due to photodetector shot noise. The bias phase error is a function of the electronic circuitry used for the phase measurement and the purity of the waveforms used. If phase measurements are taken with null type circuitry, the bias error can be reduced by reversing the phase of both the transmitted frequency and the reference frequency and by making two phase measurements, one on each combination of phases. The differences between the positive null (unreversed reference and transmitted phase) and the negative null (reversed reference and transmitted phase) are a measure of the bias error due to the null circuitry itself, and may be averaged out by taking such multiple phase measurements. This error can also be minimized by using a more linear phase resolver and by improving the purity of waveforms used throughout the measuring circuitry. Any residual electronic bias can be eliminated through appropriate offset techniques such as a slight constant delay or phase shift introduced in compensation therefor.

The RMS phase error is minimized by utilizing the law of large numbers in making a large number of individual measurements and taking the average of the results and displaying only the averaged result while shot noise RMS fluctuations may be minimized by narrowing the bandwidth of the photodetector electronic circuitry.

Accordingly, it is an object of this invention to provide laser distance measuring equipment wherein the transmitted laser beam is modulated at a relatively high radio frequency and the returned laser beam is electronically converted to a much lower intermediate frequency before signal processing thereby permitting a greater accuracy in determining any existing phase difference between the transmitted and returned laser beams.

It is another object of this invention to provide laser distance measuring equipment utilizing an intermediate frequency signal for phase comparison purposes which intermediate frequency has a fixed ratio with respect to a reference radio frequency signal thereby insuring that each cycle of the reference radio frequency corresponds to a fixed interval of phase difference between a reference and return intermediate frequency signal.

Yet another object of this invention is to provide laser distance measuring equipment including provisions for taking a plurality of ranging measurements with laser beam modulation frequencies having frequency differences corresponding to successively longer half-wavelengths at successive decades of a basic measurement unit with respect to a fundamental frequency thereby permitting a determination of successively higher significant digits for an overall range measurement between the equipment and a remote target site.

A further object of this invention is to provide laser distance measuring equipment wherein a phase difference between transmitted reference and received return intermediate frequency signals is measured by adding clock pulses during a phase delay interval beginning with part of one such IF signal and terminating with a corresponding part of the other IF signal pulse thereby directly providing a digital indication of the phase difference.

A still further object of this invention is to provide laser distance measuring equipment as above which includes digital counting, storage and display devices with appropriate control means for automatically computing, storing and displaying the significant figures of a total range measurement comprising a plurality of individual range measurements made with a like plurality of frequencies, thereby providing a completely automatic distance measuring device which is both accurate and convenient with a digital output display.

A further object of this invention is to provide apparatus of the aforesaid description which includes means for correcting errors in said measurement introduced by variations in ambient temperature, pressure, or humidity.

Another object of this invention is to provide a laser distance measuring technique whereby successive measurements are taken at frequencies having frequency differences with one another corresponding to half-wavelengths which differ by decades of a basic unit of measurement, thereby minimizing both the number of necessary measurements and the necessary frequency bandwidth over which the electronic circuitry must operate.

Still another object of this invention is to provide unique digital logic circuitry for deriving intermediate frequency signals having fixed frequency and phase relationships with respect to a reference radio frequency signal.

A more complete understanding of this invention may be obtained by carefully studying the following detailed description in conjunction with the drawings of which:

FIG. 3 is a block diagram of frequency oscillator and SSB mixer circuits suitable for use with this invention;

FIG. 4 is a logic block diagram of a unique digital frequency dividing circuit delivering intermediate frequency signals having fixed phase and frequency relationships with respect to an input signal, and FIG. 5 depicts waveforms at various points in the circuit of FIG. 4.

Figure 1:
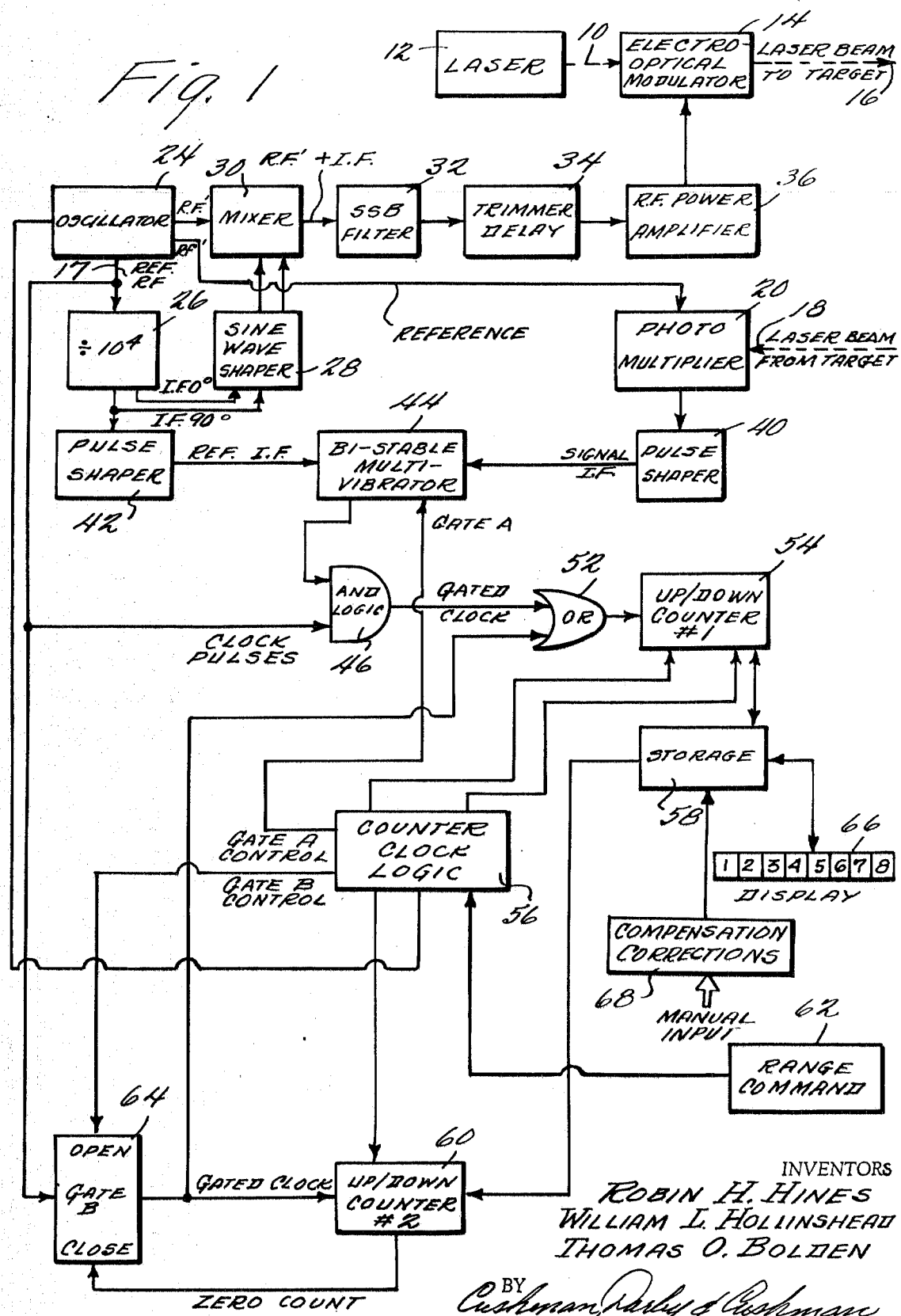
FIG. 1 is a block diagram of one illustrative embodiment of laser distance measuring equipment constructed according to this invention.

Referring to FIG. 1, an illustrative embodiment of this invention is shown for taking a first ranging measurement with a fundamental frequency modulated laser beam having a relatively short wavelength and thereby accurately obtaining several of the least significant digits for a total range measurement. Then additional ranging measurements at frequencies having frequency differences with the fundamental corresponding to half-wavelength differences of successive decades of a basic unit of measure such as a meter are taken, thereby permitting the addition of more significant digits until a total measurement with all significant figures has been obtained. A laser beam 10 is generated by a helium neon laser 12 and passed through an electro-optical modulator 14 on its way to a remote target site. At the remote site, the incident laser beam 16 is either reflected back upon itself or along a parallel path (for instance, by corner-cube reflectors) as a return beam 18 which is allowed to fall upon the active surface of a photodetector multiplier tube 20. The lower output 17 of the oscillator is a reference RF signal (equal to the fundamental frequency in the preferred embodiment) input to a frequency divider 26 which produces, as an output, a square wave intermediate frequency (IF) 10,000 times lower in frequency than the input reference RF radio frequency signal. As pointed out in more detail later, there are actually two IF output signals, one of which lags the other by 90 electrical degrees. After shaping by appropriate sine-wave shaping circuitry at 28, the reference IF signals are combined with the radio frequency signal RF' in mixer 30. As will be more particularly described below, the output from mixer 30 is the sum frequency RF'+IF. However, if a different type of mixer is used which also produces unwanted frequencies, single sideband filter 32 is designed to pass only the desired sideband at frequency RF'+IF while rejecting all other sidebands which might be included in the output from mixer 30, thus producing a single radio frequency output signal (RF'+IF) to delay element 34 which is included to provide for a slight adjustable delay in compensation for various instrument offsets thereby insuring that the resulting distance measurement corresponds to the actual distance from a plumb line to the distant site rather than including some effective or actual offset distance as well. It is to be understood that this delay can be introduced at any point in the transmission path and does not necessarily follow SSB filter 32. After this slight delay, the continuous wave RF signal is amplified by amplifier 36 and applied to electro-optical modulator 14 (for instance, a Kerr cell) which effectively modulates the intensity or amplitude of transmitted beam 16 in accordance with the radio frequency (RF) signal. In the preferred embodiment, the half-wavelength in air of this modulated beam 16 is chosen to be 10 meters for the smallest wavelength with successive frequencies having frequency differences corresponding to half-wavelength differences with the fundamental of 100 meters, 1,000 meters, etc.

In the preferred embodiment the following frequencies are used:

| OSCILLATOR MODULE OUTPUTS | SSB MIXER OUTPUTS |
|---|---|
| $f_1' = 14.983482$ MHz | $f_1 = 14.984984$ MHz |
| $f_2' = 14.968497$ MHz | $f_2 = 14.969995$ MHz |
| $f_3' = 14.833632$ MHz | $f_3 = 14.835130$ MHz |
| $f_4' = 13.484984$ MHz | $f_4 = 13.486482$ MHz | where IF = 1.49835 KHz.

These frequencies are preferred because the fundamental $f_1$ has a half-wavelength in air under normal atmospheric conditions ($n = 1.000310$) of 10 meters. The important frequency and wavelength differences are summarized below:

| FREQUENCY DIFFERENCE | HALF-WAVELENGTH |
|---|---|
| $f_1-f_2=14.98$ Khz | 10,000 meters |
| $f_1-f_3=149.8$ Khz | 1,000 meters |
| $f_1-f_4=1.498$ Mhz | 100 meters |

Four oscillators for the four separate frequencies required are housed in the same module with each turned on by a logic pulse from the computer board or RANGE COMMAND 62. Each of the four oscillator frequencies (RF') is 1.498 KHz less than the actual required transmission frequency and the actual transmission frequency in each case is obtained by dividing the reference RF 14.9835 MHx to an IF of 1.498 KHz. This local IF is then mixed (up-converted) with the selected RF' frequency to obtain a single-side band frequency that is the desired transmission frequency.

Each of the oscillator outputs RF' is also utilized to bias photo multiplier 20 such that the output from photo multiplier 20 (caused by return beam 18) contains sum and difference frequencies. The lower difference frequency will pass from the photo multiplier as the return signal output with a frequency equal to the original intermediate frequency IF while the higher sum frequency will be effectively attenuated due to the low-pass frequency bandwidth characteristics of the photo multiplier 20 and pulse shaper 40. The reference intermediate frequency IF signal is also applied to a similar pulse shaper 42 before the reference IF signal and the returned IF signal are applied to two separate inputs (set and reset) of a bi-stable multi-vibrator 44 which is a part of the count circuitry to be described below.

By using the up-converting process, the original oscillator frequencies RF' from the oscillator may also be used as reference frequencies to down-convert the return signal on beam 18 to a signal IF for operating the count circuitry. The original 14.9835 MHz reference RF may then be used for a pulse or clock count on all the frequencies RF' since all the IF frequencies are the same.

The embodiment of FIG. 1 requires that the laser light be amplitude modulated at four different frequencies with the fundamental reference frequency $f_1$ at 14.9835 stable to $1:10^6$ and the remaining three frequencies stable to $5:10^6$ to achieve the optical phase shift accuracy necessary for a $1:10^6$ accuracy for the overall instrument. Also, the IF frequency of 1.49835 KHz must be accurate to $1:10^4$. If the IF of the photodiode were derived from two separate oscillators, one for transmission and one for a reference, each would have to be accurate to $1:10^{10}$. However, by deriving both the transmission frequency and the reference frequency from the same source, the $1:10^6$ is sufficient.

Assuming operation at a frequency (14.985 MHz) having a half-wavelength in air of 10 meters and a one-way distance from the apparatus to the target site of 535.22 meters, it will be appreciated that if a positive going zero of the reference or return IF signal turns or sets bistable multi-vibrator 44 "on," a similar positive going zero of the returned or reference IF signal will be available to turn or reset bi-stable multi-vibrator 44 "off" at a subsequent time which is proportional to the phase shift between the two signals and which time interval is therefore a measure of the fractional non-integral wavelength included in the round trip path to the remote site and back again. The output of multi-vibrator 44 during this "on" interval is used to gate clock pulses through "AND" gate 46 which are obtained directly from the reference RF signals which are constrained by frequency divider 26 to have a $1:10^4$ relationship. Thus each clock pulse always corresponds to 1/10,000 of a complete cycle of the intermediate frequency IF. That is, in the previous example, AND gate 46 would have been "on" for 0.522 of a complete cycle of the reference IF signal corresponding to 5,220 clock pulses which in turn corresponds to 5.22 meters. These gated clock pulses are then passed on to digital computation circuitry which will be described in more detail later for storage and/or computation before being digitally displayed as a total range measurement.

Of course, the phase measurement made on each frequency is only the fractional part of the phase delay and does not include the unknown number of integral wavelengths. Using the previous example of 535.220 meters, the total phase shifts on each frequency for the preferred embodiment are then:

$\phi_2 = 53.5220$
$\phi_2 = 53.4685$
$\phi_3 = 52.9863$
$\phi_4 = 48.1698$

However, the instrument can determine only the fractional parts:

| Measured Phase Shifts | | Counted Pulses $\div$ 10 |
|---|---|---|
| $\Phi_1' = 522.0$ | = | $D_1$ |
| $\Phi_2' = 468.5$ | = | $D_2$ |
| $\Phi_3' = 986.3$ | = | $D_3$ |
| $\Phi_4' = 169.8$ | = | $D_4$ |

As pointed out above, the computation of the total range is somewhat more involved since it is the frequency differences with the fundamental which have decade related half-wavelengths rather than the actual frequencies. To explain the necessary calculations, it is instructive to consider the case where the actual frequencies are so related. In this case if one assumes partial ranges $R_1$, $R_2$ and $R_3$ and $R_4$ corresponding to increasingly longer wavelength measurements made at frequencies $F_1$, $F_2$, $F_3$ and $F_4$ respectively having half-wavelengths of $\lambda_1$, $\lambda_2$, $\lambda_3$ and $\lambda_4$ corresponding to 10, 100, 1,000 and 10,000 meters then the following equations describe the total range measurement $R_T$ where the N's represent unknown numbers of integral wavelengths.

$R_t + (N_1 = S_1) \lambda_1$
$R_t + (N_2 = S_2) \lambda_2$
$R_t + (N_3 = S_3) \lambda_3$
$R_t + (N_4 = S_4) \lambda_4$ Assuming that $N_4$ is equal to zero if the maximum range of the instrument is not to be exceeded, the following equations describe the desired result where each measurement results in three significant digits.

$$R_T = R_1 + R_2 + R_3 + R_4$$

where:

$R_1 = S_1/100$ (exact, units and fractional digits)
$R_2 = S_2/10 - R_1$ (10's place digit only)
$R_3 = S_3 - (R_2 + R_2)$ (100's place digit only)
$R_4 = 10S_4 - (R_1 + R_2 + R_3)$ (1000's place digit only)

If the half-wavelengths for successive measurements are themselves related by powers of 10, then the pulses gated by AND gate 46 would be a direct digital indication of $S_1$, $S_2$, $S_3$ and $S_4$ in fractions of 1/10,000 of the modulation half-wavelength and the resulting calculation would be relatively straightforward. However, as previously pointed out, the successive half-wavelengths of the frequency differences with the fundamental are related such that the half-wavelength of these frequency differences with the fundamental are 100, 1,000 and 10,000 meters or any other desired unit of length.

Because of this, one additional calculation step must be performed to derive $S_1$, $S_2$, $S_3$ and $S_4$ for the above equations. If $D_1$, $D_2$, $D_3$ and $D_4$ are allowed to represent phase difference measurements made at the previously described frequencies $f_1, f_2, f_3$ and $f_4$ it has been discovered that:

$S_1 = D_1$
$S_2 = D_1 - D_2$
$S_3 = D_1 - D_3$
$S_4 = D_1 - D_4$

Using the data for the previous example of 535.220 meters:

$S_1 = D_1 = 522.0$
$S_2 = D_1 - D_2 = 053.5$
$S_3 = D_1 - D_3 = 535.7$
$S_4 = D_1 - D_4 = 352.2$

Figure 2:
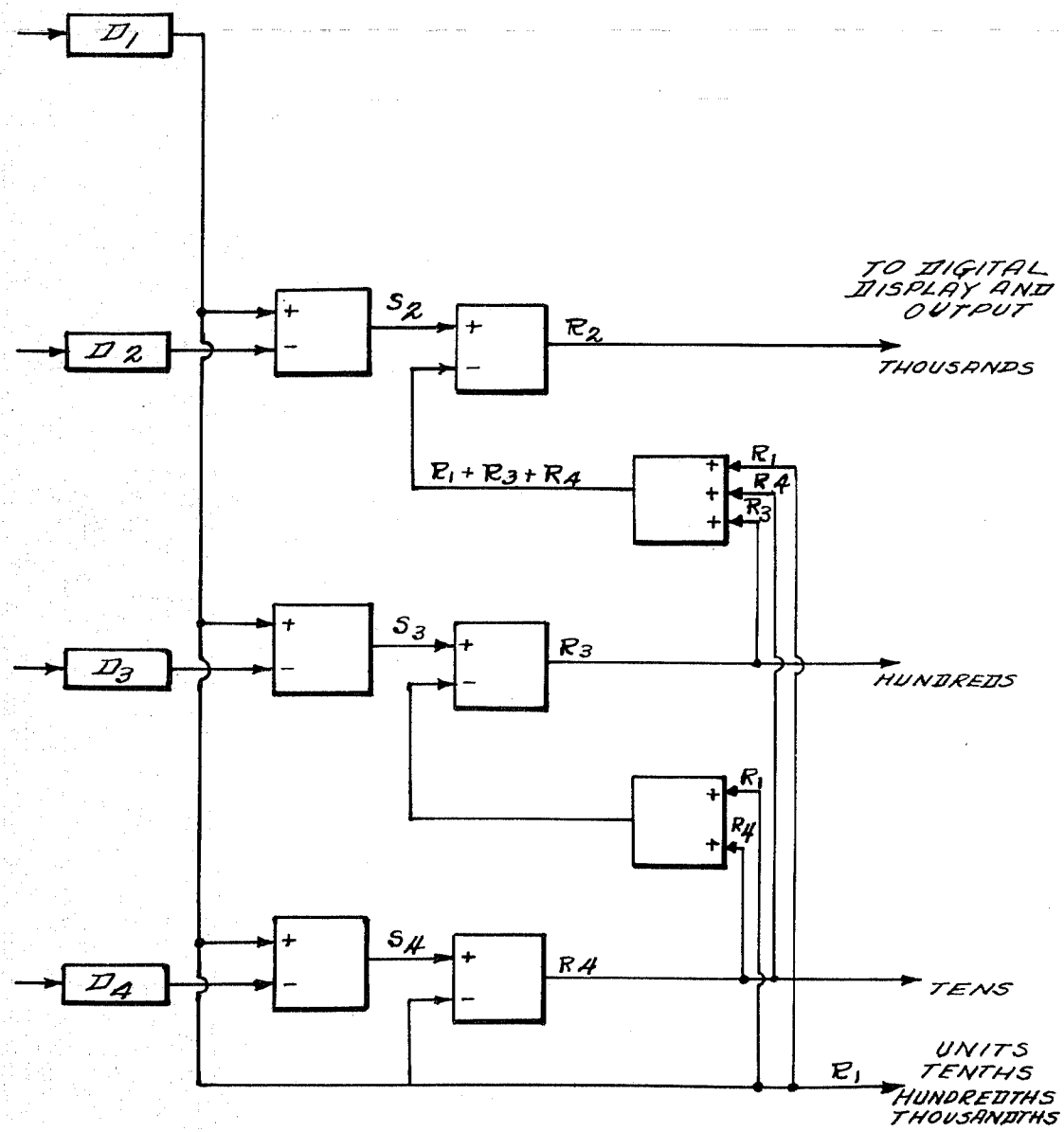
FIG. 2 is a block diagram of digital circuitry which may be used for computing a distance from phase differences measured according to this invention.

Then
$R_1 = S_1/100 = 522.0/100 = 5.220$
$R_4 = S_4 - R_1 = 35.22 - 5.22 \cong 30.000$
$R_3 = S_3 - (R_1 + R_4) = 535.7 - 35.220 \cong 500.000$
$R_2 = 10S_2 - (R_1+R_2+R_4) = 0535 - 535 \cong 0000.000/0535.220 = R_T$ Referring now to FIG. 2, a block diagram is shown for digital circuitry which may be used to derive a total range measurement in meters or any other basic measurement unit, from the four phase difference measurements $D_1$, $D_2$, $D_3$ and $D_4$. The diagram is self-explanatory to anyone skilled in the art in that it basically outlines a solution to the above equations. Since all computations are performed in the decimal system, multiplying or dividing by integral powers of ten is accomplished by translating the digits appropriately during date transfers. Similarly, necessary rounding may be accomplished by merely dropping all but the most significant digits during data transfer.

Apparatus for actually performing these digital computations is schematically shown in FIG. 1. Gated clock pulses from AND gate 46 are presented as input to "OR" gate 52 and from there to up/down counter 54 which is controlled by logic means 56 and which is in both "in" and "out" communication with storage means 58. A second up/down counter 60 is also controlled by logic means 56 and is in "out"-only communication with storage means 58. A range command unit 62 may, through controlling logic means 56, a gating means for each separate frequency in oscillator module 24, cause successive phase measurements to be taken at each of a plurality of frequencies $f_1, f_2, f_3$ and $f_4$ with the results from each measurement stored in storage means 58. Thereafter, a computation cycle may be begun wherein each of the above partial range equations for $R_1, R_2, R_3$ and $R_4$ is computed by first putting the positive terms in up/down counter 54 (adding one to another if more than one term) and the negative terms in up/down counter 60 (again adding if more than one term). Then, both counters are down counted simultaneously with clock pulses gated through gate means 64 which is automatically closed when up/down counter 60 reaches a zero count and the count remaining in up/down counter 54 is the desired result which may be appropriately stored in 58 for eventual display. By successively calculating the desired functions and storing the results in storage means 58, the entire range measurement with all significant figures may be completely calculated and stored for subsequent display on display means 66.

For example, at the fundamental frequency $f_1$, counter 54 indicates the clock pulse count upon receipt of the reference IF pulse by flip-flop 44 and stops the count upon similar receipt of the signal IF pulse. The total count is the value for $D_1 = S_1 = R_1$. This value for $D_1$ is placed in storage for the total range display and pre-loaded into Counter 54 which is then counted down during the clock pulse count period for $D_4$ thus providing $S_2$ directly at the end of the count. Values for $S_2$ and $S_3$ are similarly derived.

Since all computations are performed in the decimal system, multiplying or dividing by integral powers of ten is accomplished by proper manipulation of store-counter-storage data transfer. The instrument offset (not being over the plumb point) is entered on device 68 by thumbwheel selectors or other appropriate manual digital input means, is electronically added to this number and this subtotal of incorrected measured distance is multiplied by the approximate preset index of refraction in parts per million correction factor for atmospheric conditions which factor has also been previously entered in storage means 58 or its equivalent. These corrections are all performed during digital computations. The resulting correction for atmospheric conditions is then added (or subtracted) from the uncorrected subtotal to give the actual total slope distance on a numeric indicator panel 66.

Since the instrument has the optical power to exceed the 10 Km, 10 Km increments may be entered into the instrument by a manual selector switch.

By appropriately programming logic means 56 and range command means 62, a plurality (100 in the preferred embodiment) of individual measurements may be taken at each frequency and then divided by the number of separate measurements to obtain an average measurement and thus minimize any random or RMS errors. Preferably, all logic circuitry is TTL with a high percentage of MSI TTL for high reliability and maximum function per unit volume ratio.

Referring now to FIG. 3, the oscillator 24, trimmer delay 34, mixer 30 and SSB filter 32 are shown in more detail. There are in effect four oscillators 100, 102, 104 and 106 for delivering frequencies $f_2, f_3, f_4$ and $f_1$ respectively. Range command module 62 is connected through logic board 56 to each oscillator and is effective to permit only one of the frequencies $RF_1', RF_2', RF_3'$ or $RF_4'$ to appear at the right-hand output terminals shown in FIG. 3. This result may be achieved by placing a logic controlled gate in series with the output from each oscillator. As previously pointed out, reference RF is always necessary to generate the required IF signals and therefore oscillator 106 is effective to continue to provide this frequency at its lower output terminal even if frequency $RF_1'$ is terminated under the control of range command 62.

Adjustable delay lines 108, 110, 112 and 114 function as trimmer delay 34 in FIG. 1 and are connected in series with signals coming from the oscillators $RF_2'$, $RF_3', RF_4'$ and $RF_1'$ respectively. These variable delays are adjusted to compensate for internal phase shifts within the instrument or instrument offsets from a plumb line and are adjusted to set the digits on display 66 to zero when the instrument is in an internal calibrate condition. In the preferred embodiment, delay lines with a total delay of 100 nanoseconds are employed.

Next comes an isolation stage comprising oneway electrical gates 116, 118, 120 and 122 respectively connected to the outputs of delay lines 108, 110, 112 and 114. The intended purpose of such gates is to prevent radio frequency energy from one line from returning to another oscillator through the other delay lines. One acceptable one-way gate device is a field effect transistor (FET) with the gate connected as the input and the drain connected as the output terminal.

A high input impedance isolation amplifier 123 such as an emitter or cathode follower is also connected as a common amplifier for signals between node 124 and coupling capacitor 126 to provide further isolation. Isolation amplifier 125 provides the necessary RF' for frequency down conversion to photo detector and multiplier 20.

Elements 128 and 130 can be any electrical circuit which produces respectively $+\pi/4$ and $-\pi/4$ phase shifts. Perhaps the most usually used circuit of this type are high and low pass RC circuits which have parameter values chosen to produce the requisite shifts.

If the signal at capacitor 126 is assumed to be $E_2 \cos (w_2t - \pi/4)$ then after phase shifting, the signals at mixer inputs 132 and 134 are respectively $E_2 \cos w_2t$ and $E_2 \cos (w_2t - \pi/2) = E_2 \sin w_2t$. The result is two RF signals separated in phase by 90° entering the two double balanced mixers 136 and 138. At the same time, in a manner to be described below, two reference IF signals have been derived which are also separated by 90°. Signals $E_1 \cos w_1t$ and $E_1 \cos (w_1t - \pi/2) = -E_1\sin w_1t$ are respectively presented on input terminals 140 and 142 to mixers 136 and 138.

Mixers 136 and 138 are of a standard type which may be purchased as a module and which function to produce an output equal to the negative product of two inputs. It follows that the output signal on line 144 is $-E_1E_2\cos w_1t \cos w_2t = -E_1E_2/2\ [\cos (w_1+2)t + cos$ $(w_1-w_2)t$] and the signal on line 146 is $-E_1E_2 \sin w_1 t \sin w_2 t = E_1E_2/2 [\cos(w_1-w_2)t - \cos(w_1+w_2)t]$. These two outputs are effectively added by connection to a common input node of transistor amplifier 148 to produce the final output $-E_1E_2 \cos(w_1+w_2)t$.

Using the circuit of FIG. 3, it should now be appreciated that the final output is already SSB and no further SSB filter is necessary since the mixing and filtering functions have been effectively combined by using two double balanced mixers. It is apparent that if only one such mixer is used, a SSB filter would be required to remove the unwanted lower sideband.

FIG. 4 discloses a unique logic circuit for digitally deriving the previously discussed IF signals separated by 90° and having a fixed frequency relationship with respect to a higher frequency reference RF signal.

The reference RF signal is actually 14.985 MHz in the preferred embodiment. However, to simplify the explanation of FIG. 4, this value has been rounded to 15 MHz.

Frequency dividers 200, 202 and 204 in FIG. 4 may be decade counters such as those manufactured by Texas Instruments and identified with U.S. Pat. Ser. No. 7490. The sole function of these three dividers is to obtain a $1:10^3$ reduction in frequency from the input reference RF. The resulting 15 KHz signal is a square waveform. A circuit for obtaining two squarewaves at 1.5 KHz and separated by 90° from a symmetrical 3KHz (twice the output frequency) is shown to the right of box 206 in FIG. 4. However, to effectively utilize this circuit, a symmetrical 3KHz square wave signal must first be produced from the available 15 KHz signal and this is the function of the apparatus shown in box 206. Effectively what is required is a frequency division by an odd number (5) whereas the usual digital frequency division is by powers of two.

The 15KHz input to 206 is first divided by four (element 208 which may be part of a decade counter) and by two (element 210 which may also be part of a decade counter). The non-symmetrical outputs of 208 and 210 are then directly combined in "NAND" 212. These same outputs are also combined in "NAND" 214 after the lower frequency output has been inverted at 216. Clock signals are supplied to flip-flop 218 through inverter 220 from the 15KHz input to 206. Terminal J of flip-flop 218 is grounded while the enable or K terminal is connected through inverter 222 to the output of NAND 212 and the preset or P terminal of 218 is connected directly to the output of NAND 214. The result is a "true" output from flip-flop 218 whenever there is a positive or "true" signal at terminal K and a negative going clock signal at C. There is also a "true" output from 218 whenever terminal P is "false" or negative. A study of the timing diagrams for the signals present at the previously described elements will reveal that the output from flip-flop 218 is a symmetrical 3KHz square wave.

One of the 1.5 KHz IF outputs is obtained by merely dividing the 3KHz signal by two with frequency divider 224 which may be a flip-flop. At the same time, the 3KHz signal is passed through NAND gates 226 and 228 in tandem to obtain a short delay thus insuring that a corresponding signal has already appeared at the output of flip-flop 224 before any attempted processing occurs in flip-flop 230. An inverter 232 inverts the slightly delayed 3KHz signals before presenting them as clock pulses to flip-flop 230.

Referring now to the timing diagram in FIG. 5, it will be shown that the output from flip-flop 230 is delayed by 90° from the output at 224. The 3KHz input to divider 224 is shown at A. Assuming that 224 is a J-K flip-flop connected to trigger on negative transitions, the output from 224 is shown at B as a 1.5 KHz signal. Flip-flop 230 has its J and K terminals connected to the output from 224 (inverter 234 inverting the input for the J terminal) J terminal) as to insure that it flips in opposition to flip-flop 224. Further, the 3KHz clock for flip-flop 224 is inverted as shown at C in FIG. 5 (the slight delay is negligible on the scale of FIG. 5) and thus the output from 230 is as shown at D, delayed 90° from the waveform at B. These two 1.5KHz IF signals separated by 90° are subsequently filtered into sine waves and used in the balanced mixers of FIG. 3 as previously described.

Thus, a laser distance measuring apparatus has been described which is particularly adapted for making an accurate overall range determination which is completely automatic and which provides for a digital output display. While only a preferred embodiment of this invention has been described in detail, it will be appreciated by those skilled in the art that many modifications of this preferred embodiment may be made within the scope of the invention.

What is claimed is:

1. In a distance measuring apparatus comprising a light source, modulating means for modulating the intensity of a beam of light from said source at a predetermined radio frequency with an RF electrical signal, means for transmitting said modulated light beam to a remote target, photo detection means for detecting a reflection of said beam from said remote target and for providing a return RF electrical signal in response thereto, means for providing an intermediate frequency reference IF electrical signal indicative of the phase of said modulating signal, means for providing a second IF electrical signal at said intermediate frequency indicative of the phase of said return signal, digital phase comparison means for determining the phase difference between said reference IF signal and said second IF signal, and digital computation means for computing a distance proportional to said phase difference; the improvement in signal-providing means which comprises:

a. a primary oscillator for generating a reference RF electrical signal;

b. frequency divider means operatively connected to said primary oscillator for providing said reference IF signal having a fixed frequency ratio with said reference RF signal;

c. first mixing means operatively connectable to said primary oscillator and operatively connected to said divider means for mixing said reference RF signal and said reference IF signal to thereby provide a primary beam-modulating RF signal having said predetermined frequency; and d. second mixing means operatively connectable to said primary oscillator and operatively connected to said detection means for mixing said reference RF signal and said return RF signal to thereby provide said second IF signal;

e. said digital phase comparison means being operatively connected to said frequency divider means and to said second mixing means to receive there-from, respectively, said reference IF signal and said second IF signal.

2. The improvement according to claim 1 which further comprises:
   a. a plurality of additional oscillators for generating a like plurality of additional RF signals differing in frequency and respectively having a frequency difference with said reference RF signal corresponding to a half-wavelength which is related to the half-wavelength of said primary beam-modulating RF signal by a different power of 10; and
   b. selection means for operatively connecting one or another of said primary and additional oscillators to said first and said second mixing means, whereby one or another of said reference and additional RF signals are made available for mixing, respectively, with said reference IF signal to provide one or another of a plurality of beam-modulating RF signals of different predetermined frequency and with the relevant resulting return RF signal to provide one or another of a plurality of second IF signals.

3. In an improved distance measuring apparatus according to claim 2, the further improvement comprising:
   a. logic control for said selection means to effect said operative connection of each of said primary and additional oscillators in a predetermined sequence and for a predetermined duration;
   b. said digital computation means including:
      1. storage means for storing the phase difference determinations relevant to each of said plurality of second IF signals, and
      2. control means for manipulating the stored group of phase difference determinations in accordance with appropriate mathematical formulae to thereby compute the total distance between said apparatus and said remote target.

4. The improvement according to claim 3 including digital display means operatively connectable to said computation means for visual display of said total distance.

5. In an improved distance measuring apparatus according to claim 3, the further improvement wherein said digital computation means includes:
   a. means for inserting and storing data indicative of the influence of ambient atmospheric conditions on the propagation of a modulated beam of light therein; and
   b. compensating means for digitally altering said computed total distance in accordance with the values of said inserted data.

6. In a method of measuring distance comprising modulating the intensity of a beam of light at a predetermined radio frequency with an RF electrical signal, transmitting said modulated light beam to a remote target, detecting a reflection of said beam from said remote target with photo detection means providing a return RF electrical signal in response thereto, providing an intermediate frequency reference IF electrical signal indicative of the phase of said modulating signal, providing a second IF electrical signal at said intermediate frequency indicative of the phase of said return signal, comparing said reference IF signal and said second IF signal and determining the phase difference therebetween, and computing a distance proportional to said phase difference; the improvement which comprises:
   a. generating a reference RF electrical signal;
   b. dividing the frequency of said reference RF signal to thereby provide said reference IF signal having a fixed frequency ratio with said reference RF signal;
   c. mixing said reference RF signal and said reference IF signal to thereby provide a primary beam-modulating RF signal having said predetermined frequency; and
   d. mixing said reference RF signal and said return RF signal to thereby provide said second IF signal.

7. The improvement according to claim 6 which further comprises:
   a. generating a plurality of additional RF signals differing in frequency and respectively having a frequency difference with said reference RF signal corresponding to a half-wavelength which is related to the half-wavelength of said primary beam-modulating RF signal by a different power of 10; and
   b. mixing one or another of said reference and additional RF signals respectively with said reference IF signal to provide one or another of a plurality of beam-modulating RF signals of difference predetermined frequency and with the relevant resulting return RF signal to provide one or another of a plurality of second IF signals.

8. In an improved method according to claim 7, the further improvement comprising:
   a. mixing each respective one of said reference and additional RF signals in a predetermined sequence and for a predetermined duration with said reference IF signal to thereby provide for each said duration a different one of said plurality of beam-modulating RF signals;
   b. modulating said light beam for each said duration with each different one of said beam-modulating RF signals;
   c. mixing said reference RF signal with each relevant resulting return RF signal to provide said plurality of second IF signals;
   d. comparing said reference IF signal with each of said second IF signals and determining the respective phase differences therebetween;
   e. storing the phase difference determinations relevant to each of said plurality of second IF signals; and
   f. manipulating the stored group of phase difference determinations in accordance with appropriate mathematical formulae to thereby compute the total distance between said apparatus and said remote target.

9. In an improved method according to claim 8, the further improvement comprising:
   a. deriving data indicative of the influence of ambient atmospheric conditions on the propagation of a modulated beam of light therein; and
   b. utilizing said data in said mathematical formulae to thereby alter said computed total distance in accordance therewith.

* * * * *